United States Patent [19]
Fujii et al.

[11] Patent Number: 5,257,016
[45] Date of Patent: Oct. 26, 1993

[54] APPARATUS FOR CONVERTING ORIGINAL CHARACTER OUTLINE DATA INCLUDING ABRIDGED SPECIAL SEGMENT DATA, INTO NORMAL CHARACTER OUTLINE DATA

[75] Inventors: Norihisa Fujii, Tokoname; Kazuma Aoki, Kasugai, both of Japan

[73] Assignee: Brother Kogyo Kabushiki Kaisha, Nagoya, Japan

[21] Appl. No.: 732,398

[22] Filed: Jul. 18, 1991

[30] Foreign Application Priority Data

Jul. 25, 1990 [JP] Japan ................ 2-196525

[51] Int. Cl.$^5$ ............................. G09G 1/06
[52] U.S. Cl. ................... 345/143
[58] Field of Search ............... 382/21, 22; 340/732, 340/735, 739; 395/141, 150, 151

[56] References Cited

U.S. PATENT DOCUMENTS 5,018,217 5/1991 Yoshida et al. ............ 340/735
5,115,479 5/1992 Murayama ................. 340/735

FOREIGN PATENT DOCUMENTS 0095536 12/1983 European Pat. Off. .
2236935 4/1991 United Kingdom .

Primary Examiner—Leo H. Boudreau
Attorney, Agent, or Firm—Oliff & Berridge

[57] ABSTRACT

A data converting apparatus having a memory for storing original outline data indicative of an outline of each stroke of a plurality of characters, which characters include characters each having at least one special stroke whose outline consists of ordinary segments, and a special chain of segments which defines a specific pattern. The original outline data indicative of the outline of the special stroke include ordinary segment data representative of the ordinary segments and special segment data indicative of the special chain of segments. The apparatus includes a generating device for generating a group of segment chain data representative of all the segments of the special chain of segments, based on the special segment data, and further includes a device for outputting normal outline data consisting of the ordinary segment data of the original outline data, and the group of segment chain data generated by the generating device. The special segment data preferably include data used for converting basic pattern data into the segment chain data.

15 Claims, 10 Drawing Sheets

FIG. 4

| | NOMENCLATURE OF DATA | ID CODE | DATA FOLLOWING ID DATA |
|---|---|---|---|
| 1 | STROKE START POINT DATA | S | STROKE START POINT (xS, yS) |
| 2 | STRAIGHT LINE DATA | L | SEGMENT END POINT (xE, yE) |
| 3 | BEZIER CURVE DATA | B | 1ST AND 2ND CONTROL POINTS (xQ1, yQ1), (xQ2, yQ2), SEGMENT END POINT (xE, yE) |
| 4 | STROKE END CODE | * | |
| 5 | CHARACTER END CODE | ! | |
| 6 | ACCENT SERIF DATA | A | w, ℓ |
| 7 | TRIANGULAR SERIF DATA | U | w, ℓ, h |
| 8 | PECKER SERIF DATA | O | w, ℓ, h |
| 9 | DRY STOP DATA | T | w, h |
| 10 | RIGHT SHOULDER DATA | K | ℓ, ℓ', h |
| 11 | FLAPPER SERIF DATA | H | w, ℓ1, ℓ2, h |

FIG. 14

| | | | | | | |
|---|---|---|---|---|---|---|
| S | 3.1 | 11.0 | | | | |
| L | 6.5 | 11.0 | | | | |
| U | 0.5 | 1.0 | 0.9 | | | |
| L | 3.5 | 11.5 | | | | |
| A | 0.5 | 0.5 | | | | |
| * | | | | | | |
| S | 1.7 | 9.4 | | | | |
| L | 8.0 | 9.4 | | | | |
| U | 0.6 | 1.5 | 1.1 | | | |
| L | 2.5 | 10.0 | | | | |
| A | 0.6 | 1.0 | | | | |
| * | | | | | | |
| S | 3.2 | 8.0 | | | | |
| L | 6.5 | 8.0 | | | | |
| U | 0.5 | 1.0 | 0.8 | | | |
| L | 3.5 | 8.5 | | | | |
| A | 0.5 | 0.5 | | | | |
| * | | | | | | |
| S | 3.1 | 6.5 | | | | |
| L | 6.5 | 6.5 | | | | |
| U | 0.5 | 1.0 | 0.8 | | | |
| L | 3.5 | 7.0 | | | | |
| A | 0.5 | 0.5 | | | | |
| * | | | | | | |
| S | 3.0 | 5.6 | | | | |
| L | 3.0 | 2.0 | | | | |
| O | 0.5 | 0.2 | | | | |
| L | 6.3 | 2.0 | | | | |
| O | 0.7 | 0.2 | | | | |
| L | 7.0 | 4.8 | | | | |
| K | 1.1 | 0.8 | 1.0 | | | |
| L | 3.7 | 5.5 | | | | |
| B | 3.6 | 5.5 | 3.3 | 5.4 | 3.0 | 5.6 |
| * | | | | | | |
| S | 4.5 | 5.0 | | | | |
| L | 6.3 | 5.0 | | | | |
| L | 6.3 | 2.5 | | | | |
| L | 4.5 | 2.5 | | | | |
| L | 4.5 | 5.0 | | | | |
| * | | | | | | |
| ! | | | | | | |

APPARATUS FOR CONVERTING ORIGINAL CHARACTER OUTLINE DATA INCLUDING ABRIDGED SPECIAL SEGMENT DATA, INTO NORMAL CHARACTER OUTLINE DATA

BACKGROUND OF THE INVENTION

1. Field of the Invention

The present invention relates to a data converting or processing apparatus adapted to convert stored original outline data representative of letters, numerals, symbols and other characters, into normal outline data usable for outputting the characters. More particularly, the present invention is concerned with a technique for partially compressing or abridging character outline data for reduction in required data storage capacity, and converting the abridged character outline data into the normal character outline data.

2. Discussion of the Prior Art

An apparatus for processing character outline data is used, for example, for character output devices such as a printer for printing characters on a recording medium, and a display device for displaying the characters on a display screen. An example of such a character output device includes (a) an outline data memory storing a batch of outline data representative of outlines of strokes of a multiplicity of characters, each character consisting of one or more strokes, and each stroke consisting of a plurality of segments which constitute a closed loop, (b) data converting means for converting the outline data into corresponding dot data representative of image dots defining each character, (c) means for retrieving from the outline data memory the outline data representative of desired characters that are to be printed, displayed or otherwise outputted on an appropriate output medium such as a recording medium or display screen, and supplying the retrieved outline data to the data converting means, and (d) character output means for outputting the characters according to the dot data prepared from the retrieved outline data by the data converting means.

In such a known character output device, the outline of each stroke of each character consists of a plurality of segments (straight or curved lines), each of which is represented by a set of segment data stored in the outline data memory. Thus, each segment of a stroke of a character is defined by an appropriate set of segment data, which is stored as a unit in the outline data memory.

However, a research by the present applicants indicated that storing the character outline data in the form of segment data sets representative of all individual segments of each stroke of the character is not necessarily desirable. In other words, the applicants found it desirable, in some cases, to store the character outline data such that data representative of a certain number of successive segments of a character stroke are stored as a unit.

The outline data for Chinese characters of "mincho" type style is one example of the above cases. In the "mincho" type style, some strokes of the same character or different characters have ornamental portions (as illustrated in FIG. 5) such as serifs which are similar in shape to each other. Such similar ornamental portions of different strokes may be represented by a basic ornamental pattern whose outline (open outline) is defined by basic pattern data consisting of sets of segment chain data representative of a chain of segments. If this basic pattern data are stored in a given memory, segment data sets representative of the similar ornamental portions of the different strokes can be obtained by modifying the basic pattern data (segment chain data) according to the specific size of the individual common ornamental portions. This arrangement eliminates the need of storing in the outline data memory the segment data sets which represent the similar ornamental portions of the different strokes which have the same or different sizes. Accordingly, the capacity of the outline data memory required to store the outline data for a certain number of "mincho" type style Chinese characters can be reduced as compared with the conventionally required memory capacity. Namely, the outline data processing apparatus can use an outline data memory having a reduced storage capacity.

SUMMARY OF THE INVENTION

It is accordingly an object of the present invention to provide a data converting apparatus having an outline data memory and outline data output means for outputting normal character outline data, wherein a chain of successive segments defining a specific part of a stoke of a character can be stored as a unit in an abridged form in the outline data memory.

The above object may be attained according to the principle of the present invention, which provides a data converting apparatus for converting original outline data into normal outline data, comprising: (a) an original outline data memory storing a batch of original outline data indicative of at least one closed-loop outline of each of a plurality of characters, each of the at least one outline of each character consisting of a plurality of successive segments, the plurality of characters including characters each of which comprise at least one outline each of which consists of at least one ordinary segment, and at least one special chain of segments each chain defining a specific pattern, the batch of original outline data indicative of the outline of each outline which has the at least one special chain of segments including at least one set of abridged special segment data indicative of the at least one special chain of segments, and at least one set of ordinary segment data representative of the at least one ordinary segment; (b) segment chain data generating means for generating a group of segment chain data based on each of the at least one set of abridged special segment data, the group of segment chain data being representative of all segments of each of the at least one special chain of segments; and (c) outline data output means for outputting a batch of normal outline data which consists of the at least one set of ordinary segment data stored in the original outline data memory, and the group of segment chain data generated by the segment chain data generating means.

In the data converting apparatus of the present invention constructed as described above, all segments of the closed-loop outlines of the characters are not represented by respective sets of segment data as stored in a conventional outline data memory. That is, where an outline of a character consists of ordinary segments, and a special chain of segments which defines a specific pattern, such special chain of segments is defined as a unit in an abridged or compressed form, by a set of data referred to as "a set of abridged special segment data", while the other segments of the outline are represented by respective sets of ordinary segment data. When the original outline data for a character outline which includes a special chain of segments are converted into normal outline data, the abridged special segment data are read out from the original outline memory, together with the ordinary segment data. Based on the special segment data read out from the memory, a group of segment chain data representative of all segments of the special chain of segments is generated as part of the normal outline data. For the other or ordinary segments of the outline, the ordinary segment data read out from the memory are used as part of the normal outline data. Thus, the normal outline data for a character stroke whose outline includes a special chain of segments include the segment chain data for the special chain of segments, and the ordinary segment data for the ordinary segments.

Since each special chain of outline segments appearing on the characters are stored as a unit in the form of the abridged special segment data, the storage capacity of the original outline data memory required to store the original outline data is considerably reduced. In this respect, it is noted that the volume of the abridged special segment data indicative of each special chain of segments is significantly smaller than the total volume of a plurality of sets of segment data which represent the respective segments of the special chain of segments.

For instance, the abridged special segment data consist of a pattern identification code designating one of basic patterns whose data are stored in a pattern data memory, and dimension data which are necessary for converting the basic pattern data designated by the pattern identification code, into the group of segment chain data which consist of sets of segment data representative of all the segments of the special chain of segments. The basic patterns are such that the specific pattern defined by the special chain of segments of the outline is similar to one of the basic patterns, which may be ornamental patterns such as serifs added to one end of a character stroke. Since the number of the basic patterns is relatively small as compared to the number of occurrences of the special chains of segments of the character outlines to be outputted, the total required storage capacity of the memories for the original outline data memory and the basic pattern data memory can be considerably smaller than the required capacity of the outline data memory used in the conventional data converting apparatus.

The present data converting apparatus can be suitably used for a character output device such as a dot-matrix printer (e.g., laser printer), a plotter and a data display, wherein the normal outline data are converted into corresponding dot data according to which characters are printed, plotted, drawn, displayed or otherwise outputted on a suitable output medium such as a recording paper or display screen.

DEFINITION OF THE TERMS USED HEREIN

It is to be understood that the following terms used in the present application should be interpreted to have the following definitions: character: letters (e.g., alphabetic, Chinese and Japanese letters), numerals, symbols and other visible representations.

character output device: device for printing, displaying or otherwise outputting characters.

outline: two or more successive segments (straight and curved lines) which define dimensions and shape of a character or each stroke of the character.

outline data: data representative of the outline of a character or a stroke of the character.

segment data: data representative of a segment of a stroke of a character.

stroke data: data which represent the outline of a stroke of a character and which consist of two or more sets of segment data as defined above.

special chain of segments: a chain of successive segments of a character stroke, which defines a specific portion of the stroke, which specific portion may have a shape or pattern similar to one of predetermined basic patterns (e.g., basic ornamental patterns such as a serif).

ordinary segments: segments of a character stroke other than the special chain of segments as defined above.

ordinary segment data: segment data representative of the ordinary segments of a character stroke.

segment chain data: a group of data consisting of sets of segment data which represent all the segments of a special chain of segments as defined above.

basic pattern data: sets of segment data representative of a basic pattern similar to a special chain of segments as defined above.

pattern identification code: data designating one of the predetermined basic patterns (e.g., basic ornamental patterns) which are represented by respective sets of basic pattern data as defined above.

dimension data: data indicative of dimensions of a specific portion (e.g., ornamental portion such as serif) of a character stroke which is defined by a special chain of segments as defined above and which is similar in shape to one of the basic patterns represented by the basic pattern data.

abridged special segment data: data which constitute part of original outline data and which consist of the pattern identification code and the dimension data.

original outline data: data consisting of the ordinary segment data, the abridged special segment data, and data identification codes.

normal outline data: data consisting of the ordinary segment data of the original outline data, and segment chain data which represent all segments of a special chain of segments as defined above and which are obtained by conversion from the basic pattern data (designated by the pattern identification code), based on the abridged special segment data of the original outline data.

data identification code: code which constitutes a part of the original outline data and which indicates the kind of a data set of the original outline data such as stroke start point data, straight line data, Bezier curve data, stroke end code, character end code, and pattern identification code.

dot data: data representative of presence or absence of image dots which define a character in a matrix of dots on an output medium and which are formed by character output device, the dot data being obtained by conversion from the normal outline data.

Various other terms should be interpreted by reference to the above definitions, and by reading the present disclosure taken as a whole.

BRIEF DESCRIPTION OF THE DRAWINGS

The above and other objects, features and advantages of the present invention will become more apparent by reading the following detailed description of a presently preferred embodiment of the present invention, when considered in connection with the accompanying drawings, in which:

FIG. 4 is a view indicating an arrangement of original outline data stored in a main CHARACTER ROM of the apparatus of FIG. 1;

FIG. 14 is a view showing the original outline data of the Chinese character of FIG. 13.

DETAILED DESCRIPTION OF THE PREFERRED EMBODIMENT

Figure 1:
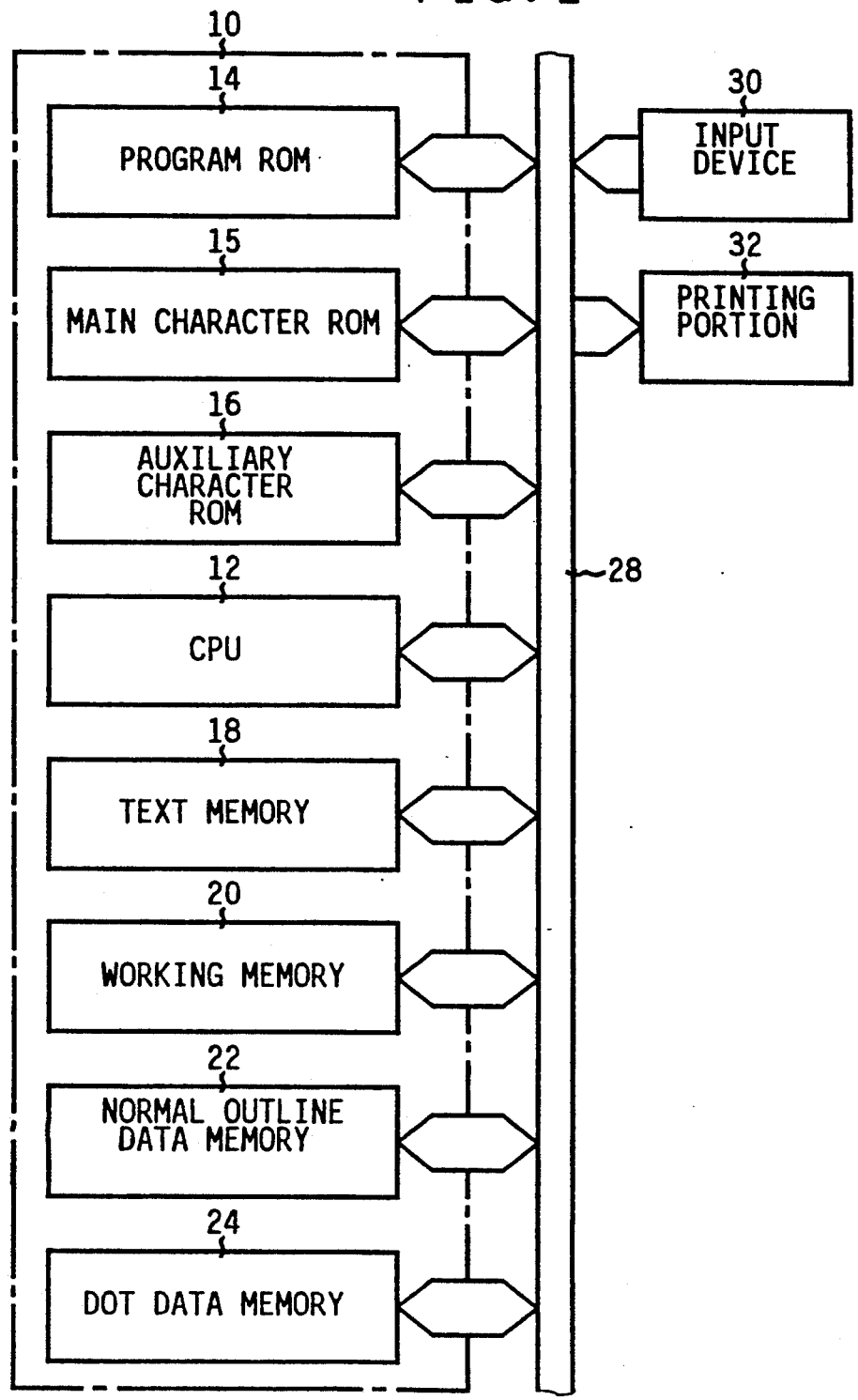
FIG. 1 is a schematic block diagram of a data converting apparatus constructed according to one embodiment of the present invention.

Referring first to FIG. 1, there is shown a part of a control system of a dot-matrix laser printer, which incorporates one embodiment of a data converting apparatus of the present invention adapted to convert original outline data into dot data usable for laser-printing on an output medium in the form of a recording medium.

In FIG. 1, reference numeral 10 denotes a computer whose constitutes a major portion of the control system. The computer 10 incorporates a CPU (central processing unit) 12, a PROGRAM ROM (read-only memory) 14, a main CHARACTER ROM (read-only memory) 15, an auxiliary CHARACTER ROM (read-only memory )16, a TEXT memory 18, a WORKING memory 20, a NORMAL OUTLINE DATA memory 22, and a DOT DATA memory 24. These elements of the computer 10 are interconnected to each other by a bus 28, which in turn is connected to an input device 30 and a printing portion 32. The input device 30 sends necessary data to the computer 10, while the printing portion 32 is operated to effect a laser-printing operation based on signals supplied from the computer 10.

Figure 2:
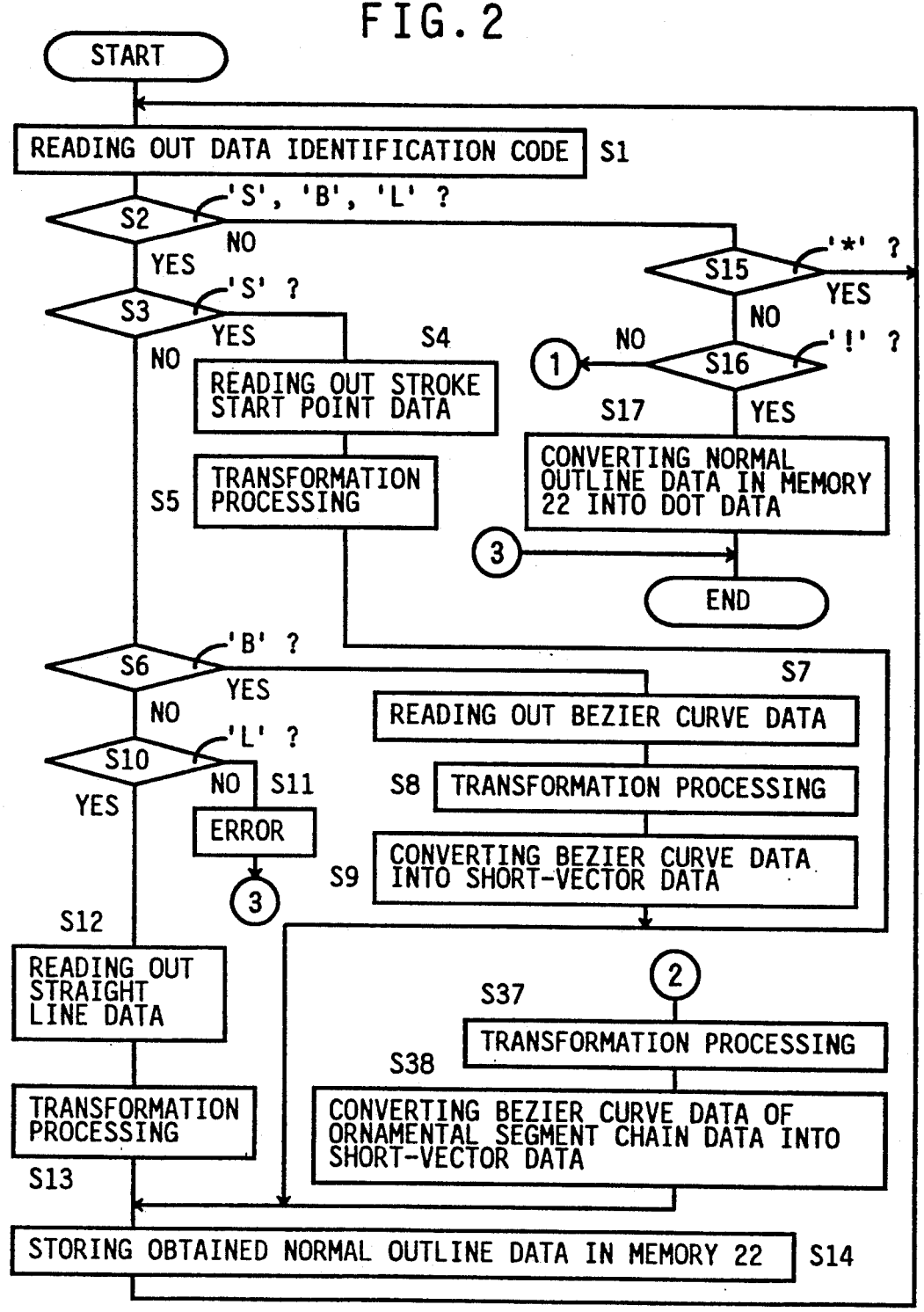
FIGS. 2 and 3 are a flow chart showing a data converting routine as one of control programs stored in a PROGRAM ROM of the apparatus of FIG. 1.
Figure 3:
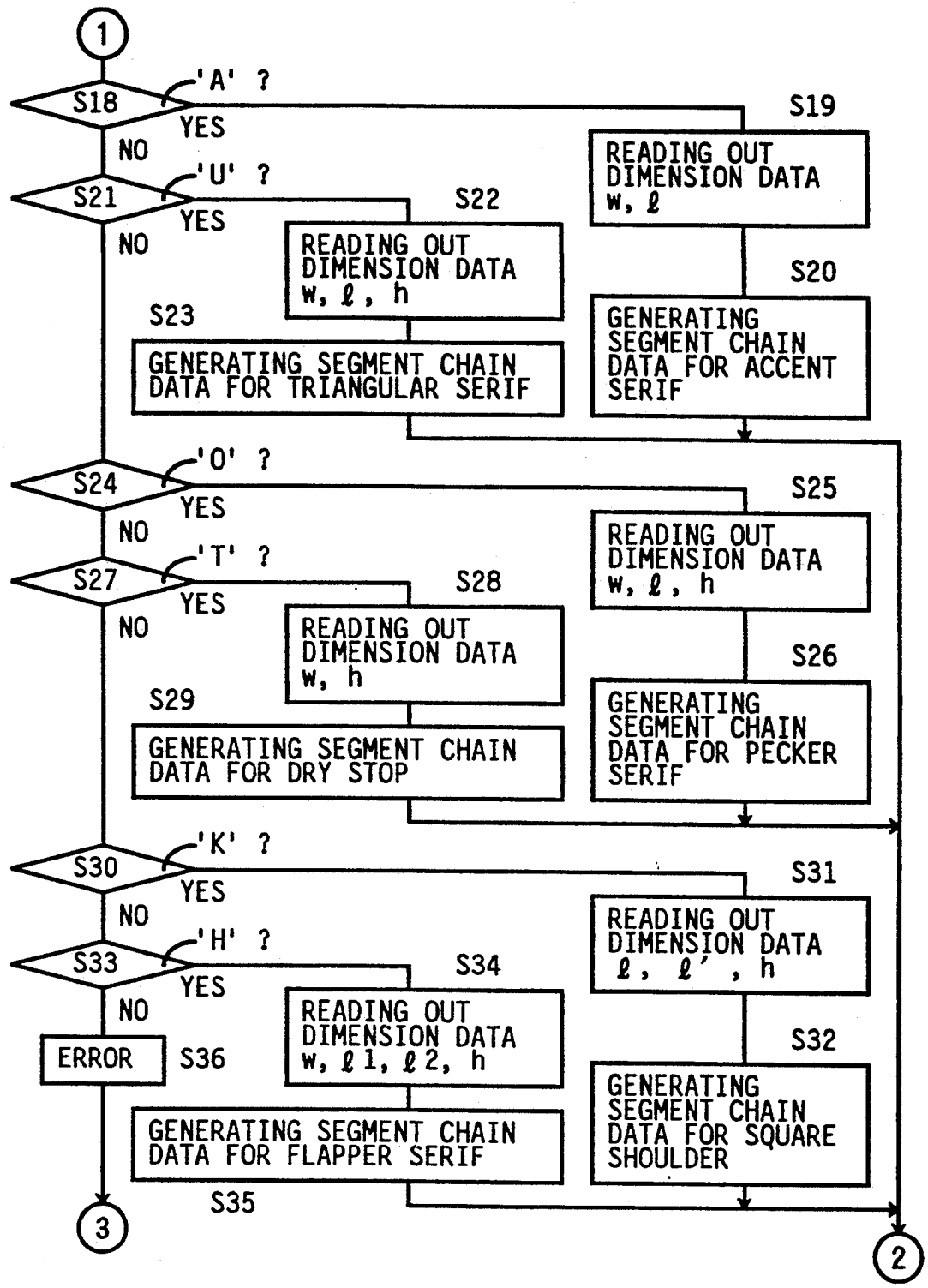

The PROGRAM ROM 14 stores various control programs such as a data converting routine illustrated in the flow chart of FIGS. 2 and 3.

The main CHARACTER ROM 15 stores a batch of original outline data for all Chinese characters available on the present laser printer. The original outline data include data identification codes which indicate or identify the individual data sets thereof. The Chinese characters are designed in the "mincho" type style. Each Chinese character has one or more strokes, each of which has an outline defined by a plurality of segments. These segments of each stroke of the characters are represented by straight lines or Bezier curves.

Where a Chinese character consists of a single stroke, the original outline data for this character include a group of stroke data representative of that stroke, which consists of sets of segment data representative of the segments of the outline of the stroke. The original outline data consists of this group of stroke data, and a character end code indicative of the end of the character. Where a Chinese character consists of two or more strokes, the original outline data consists of respective groups of stroke data, and a character end code. Each group of stroke data includes stroke start point data, stroke end code, straight line data, Bezier curve data, and abridged special segment data. The straight line data and Bezier curve data of the original outline data are referred to as "ordinary segment data" as distinguished from the "abridged special segment data".

The stroke start point data represent a start point S of each stroke of the relevant character, as seen in a predetermined direction along the outline of the stroke, i.e., the start point of the first segment of the stroke. As indicated in FIG. 4, the stroke start point data consist of a data identification code S indicating the stroke start point data per sc, and coordinate data representative of x and y coordinate values (xS, yS) of the start point S of the stroke.

The straight line data, which define a straight segment of a stroke, consist of a data identification code L indicating of the straight line data per se, and coordinate data representative of x and y coordinate values (xE, yE) of the end point E, as indicated in FIG. 4. In this respect, it is noted that since the coordinates of the start point of each straight line segment are the same as those of the stroke start point S (for the first segment) or those of the end point E of the preceding segment (for the second and subsequent segments), the straight line data include only the coordinate data of the end point and do not include coordinate data of the start point, which is defined by the coordinate data of the end point E of the preceding segment (or coordinate data of the stroke start point S). This rule applies to the Bezier curve data, and the abridged special segment data, which will be described.

A Bezier curve segment of a stroke is defined by a start point S and an end point E of the segment, a first and a second control end point Q1, Q2, and a predetermined Bezier curve function. The Bezier curve data consist of a data identification code B indicating of the Bezier curve data per se, and coordinate data representative of the coordinate values (xQ1, yQ1), (xQ2, yQ2) of the first and second control points Q1, Q2, and the coordinate values (xE, yE) of the end point E, as indicated in FIG. 4. The Bezier curve function is stored in the PROGRAM ROM 14.

As indicated above, the stroke start point data, straight line data and Bezier curve data constitute ordinary segment data of the original outline data of a character. The abridged special segment data as distinguished from the ordinary segment data will be described later.

Figure 5:
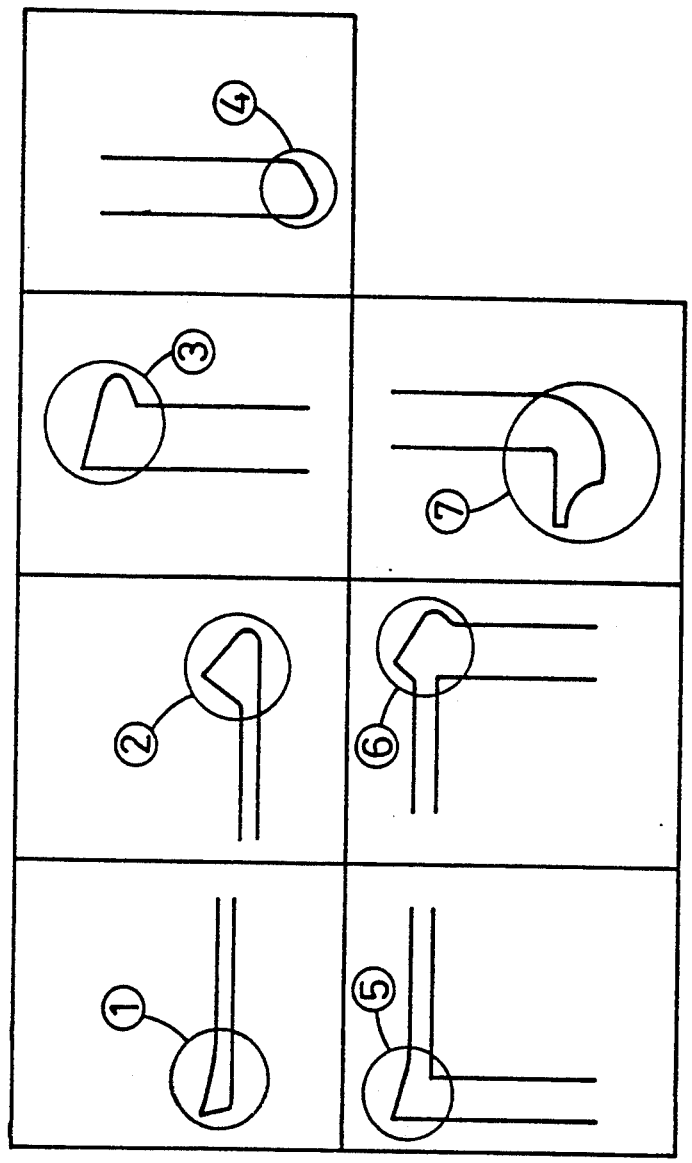
FIG. 5 schematically illustrates basic ornamental patterns for special character strokes used in the present apparatus.

The "mincho" type style Chinese characters include characters which comprise strokes having some ornamental portions, such as serifs which project from the end of the main body of the stroke. Two or more similar ornamental portions having the same or different sizes may appear on different strokes of the same character or may appear in different characters. These ornamental portions may be classified into predetermined basic ornamental patterns. Seven ornamental patterns as illustrated in FIG. 5 are well known in the art. In FIG. 5, numerals 1 through 7 respectively designate an accent serif, a triangular serif, a pecker serif, a dry stop, a sharp shoulder, a square shoulder and a flapper serif. In the present embodiment, the six ornamental patterns Nos. 1-4, 6 and 7 are used as basic ornamental patterns whose data are stored in the auxiliary CHARACTER ROM 16, as basic ornamental pattern data.

Figure 6:
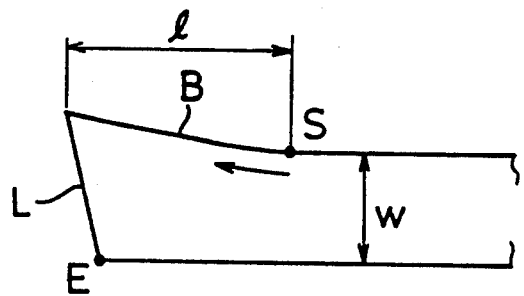
FIGS. 6-11 are views showing details of the basic ornamental patterns of FIG. 5.
Figure 7:
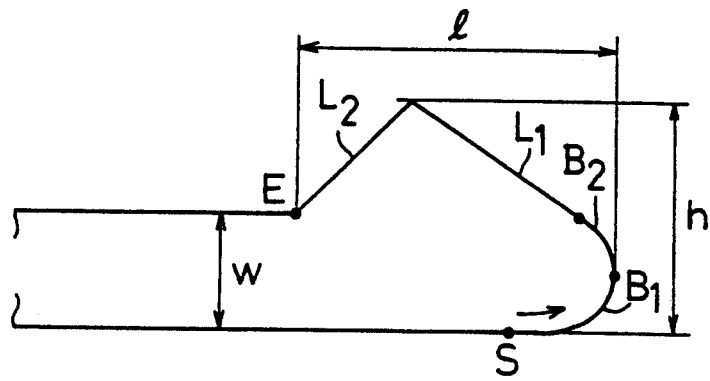
Figure 8:
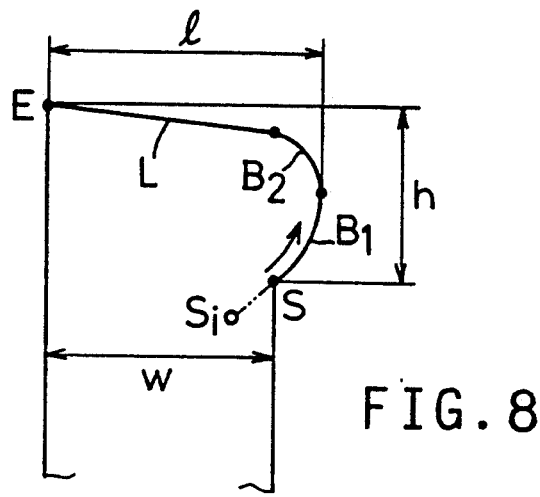
Figure 9:
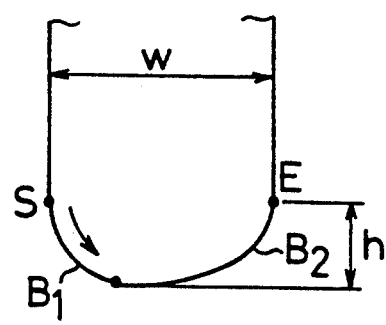
Figure 10:
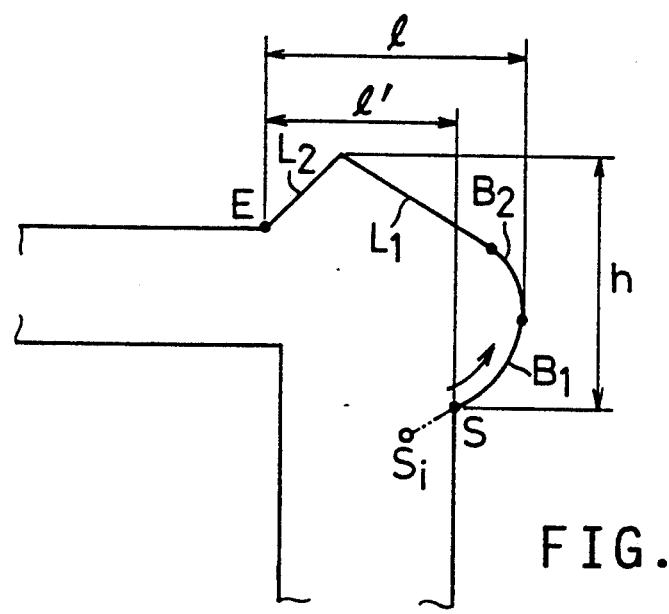
Figure 11:
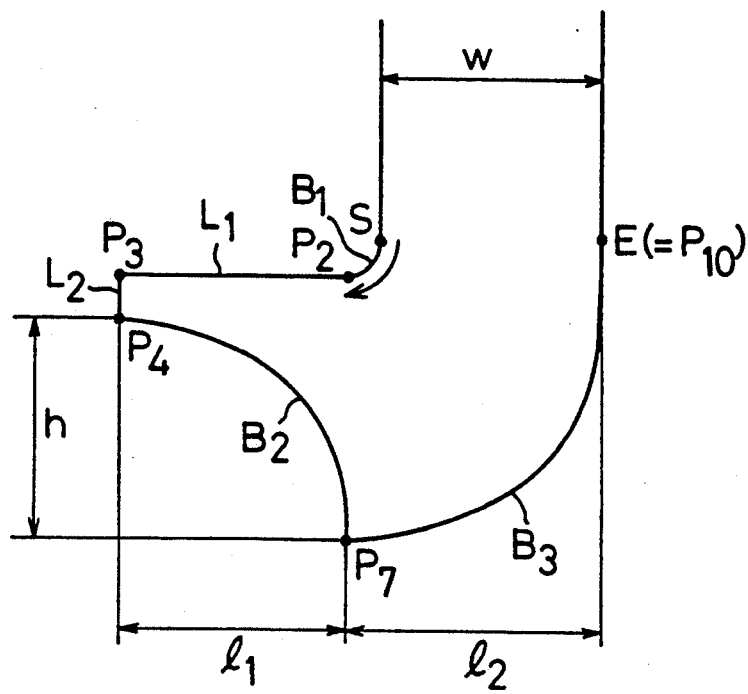

The accent serif pattern (1) consists of a Bezier curve B having a pattern start point S, and a straight line L which originates from the end point of the Bezier curve B and terminates at a pattern end point E, as shown in FIG. 6. The triangular serif pattern (2) consists of a first Bezier curve B1 having a pattern start point S, a second Bezier curve B2 originating from the end point of the first Bezier curve, a first straight line L1 which originates from the end point of the second Bezier curve B2, and a second straight line L2 which originates from the end point of the first straight line L1 and and terminates at a pattern end point E, as shown in FIG. 7. The pecker serif pattern (3) consists of a first and a second Bezier curve B1, B2 and a straight line L which are connected to each other in this order between pattern start and end points S, E, as shown in FIG. 8. The dry stop pattern (4) consists of a first and a second Bezier curve B1, B2 connected to each other between pattern start and end points S, E, as shown in FIG. 9. The square shoulder pattern (6) consists of a first and a second Bezier curve B1, B2 and a first and a second straight line L1, L2, which are connected to each other in this order, between pattern start and end points S, E, as shown in FIG. 10. Finally, the flapper serif pattern (7) consists of a first Bezier curve B1, a first and a second straight line L1, L2, a second and a third Bezier curve B2, B3, which are connected to each other in this order, between pattern start and end points S, E, as shown in FIG. 11.

Each set of basic ornamental pattern data representative of one of the above six basic ornamental patterns each defined by a chain of successive segments consists of a pattern identification code A, U, 0, T, K or H which designates or selects the basic ornamental pattern, pattern start point data, and at least two segments (straight line or lines and/or Bezier curve or curves). The pattern identification codes A, U, 0, T, K and H designates the accent serif, triangular serif, pecker serif, dry stop, square shoulder, and flapper serif, respectively. The six sets of basic ornamental pattern data corresponding to the six basic ornamental patterns of FIGS. 6-11 are stored in the auxiliary CHARACTER ROM 16. For example, the set of basic ornamental pattern data for the pecker serif pattern of FIG. 8 stored in the ROM 16 consists of the pattern identification code 0, Bezier curve data defining the first Bezier curve B1 having the start point S, Bezier curve data defining the second Bezier curve B2 following the first Bezier curve B1, and straight line data defining the straight line L1 following the second Bezier curve B2.

As indicated above, the main CHARACTER ROM 15 stores the original outline data which include the identification code designating or indicative of the kind of the individual data sets thereof. Where a stroke of a character includes a special chain of successive segments which define an ornamental portion which is similar in shape to one of the above six basic ornamental patterns, such special chain of successive segments (i.e., ornamental portion of a stroke) is represented by the appropriate set of abridged special segment data referred to above as distinguished from the ordinary segment data. As indicated in FIG. 4, the abridged special segment data consist of the pattern identification code (A, U, 0, T, K or H) designating of the relevant basic ornamental pattern, and dimension data representative of dimensions of the ornamental portion of the stroke. The dimension data are used to obtain segment data representative of the special chain of segments, based on the relevant set of basic ornamental pattern data. The segments of the stroke other than the special chain of segments are represented by the ordinary segment data also referred to above. The original outline data stored in the main CHARACTER ROM 15 for each character consist of the ordinary segment data and the abridged special segment data.

There will be described in detail the abridged special segment data, by reference to FIGS. 4 and 6-11.

Where a special character stroke includes a special chain of segments which define the accent serif, this accent serif is represented by a set of abridged special segment data which consist of the pattern identification code A, and the dimension data representative of dimensions w and l of the accent serif as indicated in FIG. 6. Where the character stroke includes the triangular serif, this serif is represented by a set of abridged special segment data which consist of the pattern identification code U, and the dimension data representative of dimensions w, l, h of the serif as indicated in FIG. 7. Where the character stroke includes the pecker serif, the corresponding abridged special segment data consist of the pattern identification data 0, and the dimension data representative of dimensions w, l, h of the serif as indicated in FIG. 8. Where the character stroke includes the dry stop, the corresponding abridged special segment data consist of the pattern identification data T, and the dimension data representative of dimensions w, h of the dry stop as indicated in FIG. 9. Where the character stroke includes the square shoulder, the corresponding abridged special segment data consist of the pattern identification data K, and the dimension data representative of dimensions l, l', h of the shoulder as indicated in FIG. 10. Where the stroke includes the flapper serif, the abridged special segment data consist of the pattern identification code H, and the dimension data representative of dimensions w, l1, l2, h of the serif as indicated in FIG. 11.

The outline of a character stroke or strokes forms a closed loop or loops, and the segments of the outline are defined in the counterclockwise direction, as a rule. Some strokes such as "口" (four connected strokes) may have an outer loop and an inner loop located inside the outer loop. Further, even a single stroke may have the inner and outer loops. In this case, the segments of the outer loop are defined in the counterclockwise direction, while those of the inner loop are defined in the clockwise direction. The start point data, straight line data, Bezier curve data, and abridged special segment data of the segments are stored in the main CHARACTER ROM 15, in the order in which the segments are defined in the predetermined counterclockwise or clockwise direction.

A code "*" is used as the stroke end code, which indicates the end of each stroke of a character. The original outline data for each character include a code "!", which indicates the end of the character (i.e., end of a batch of original outline data for each character).

Figure 13:
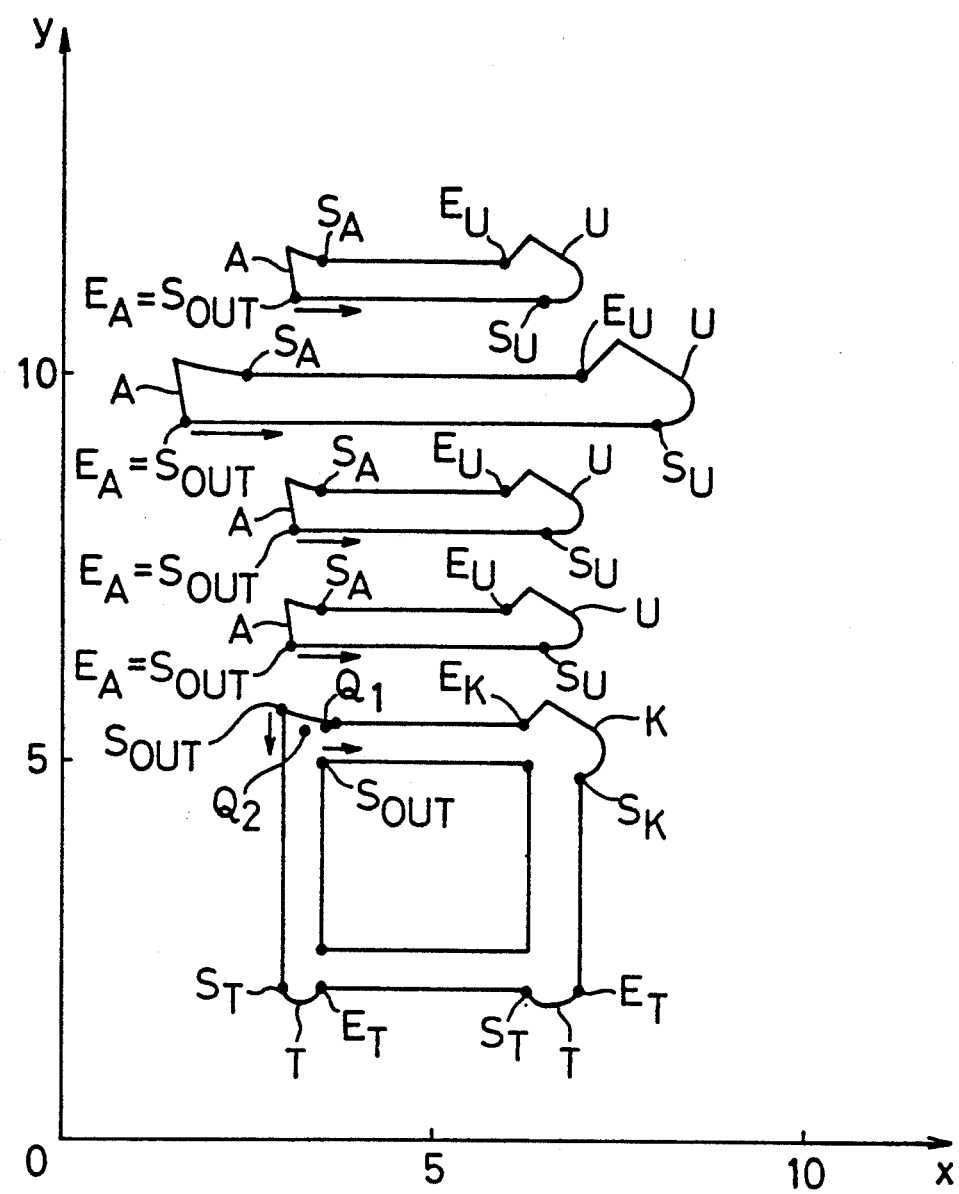
FIG. 13 is a view showing an example of a Chinese character whose original outline data are stored in the main CHARACTER ROM.

FIG. 13 illustrates the outline of a Chinese character "名" whose original outline data stored in the main CHARACTER ROM 15 are indicated in FIG. 14, by way of example. In FIG. 13, $S_{OUT}$ stands for the start point of each stroke, and A, U, T, K stand for the accent serif, triangular serif, dry stop and square shoulder, respectively. $S_A$ and $E_A$ stand for the start and end points of the accent serif A, respectively, and $S_U$ and $E_U$ stand for the stand and end points of the triangular serif U, respectively. $S_T$ and $E_T$ stand for the start and end points of the dry stop T, respectively. $S_K$, $E_K$, Q1 and Q2 stand for the start point, end point, first control point and second control point of the square shoulder K.

The TEXT memory 18 of the computer 10 shown in FIG. 1 consists of a random-access memory (RAM) for temporarily storing text data which are entered through the input device 30 and which represent a text to be printed by the laser printer. The text data include character codes designating characters of the text. The WORKING memory 20 is also a random-access memory which is used to temporarily store information necessary for executing the control programs stored in the PROGRAM ROM 14 to perform a printing operation. The data converting routine of FIGS. 2 and 3 stored as one of the control programs stored in the ROM 14 is designed to convert the original outline data for each character (designated by the appropriate character code of the text data) into normal outline data, and converting the normal outline data into dot data usable for printing the relevant character in the form of a matrix of dots. The conversion of the original outline data includes the steps of: converting the abridged special segment data into segment data representative of an ornamental portion of a stroke of the character; and modifying or changing the thus obtained segment data for the ornamental portion, and the ordinary segment data stored in the main CHARACTER ROM 15, as desired by the operator of the laser printer, to thereby prepare the normal outline data. The NORMAL OUTLINE DATA memory 22 is a random-access memory used to temporarily store the prepared normal outline data, and the DOT DATA memory 24 is a random-access memory used to store the dot data prepared from the normal outline data.

Referring to FIGS. 2 and 3, there will be described the data converting routine for converting the original outline data stored in the main CHARACTER ROM 15 into the normal outline data, and converting the normal outline data into the dot data.

The CPU 12 of the computer 10 reads out from the TEXT memory 18 the character codes one after another, and executes the data converting routine once for each character code. The data converting routine is started with step S1 (FIG. 2) for reading out from the main CHARACTER ROM 15 an appropriate one of the data identification codes of the original outline data designated by the character identification code. The original outline data include the following data identification codes: codes S, L, B, * and !; and pattern identification codes A, U, 0, T, K and H. In the first execution of the routine, for example, the appropriate data identification code is the code S indicative of the start point data representative of the stroke start point of the first stroke of the relevant character are read out in step S1. Then, in step S2, the CPU 12 determines whether or not the code read in step S1 is the code S, B or L indicative of the stroke start point data, straight line data or Bezier curve data. If an affirmative decision (YES) is obtained in step S2, step S3 is executed to determine whether the code read in step S1 is the code S, or not. If an affirmative decision (YES) is obtained in step S3, the control flow goes to step S4 in which the start point data (coordinates of the stroke start point) are read out from the main CHARACTER ROM 15. Step S4 is followed by step S5 in which the start point data are subjected to a character transformation processing desired by the operator. The character transformation processing in step S5 includes modification of the start point data for printing the character in the desired condition; character size (point size), attitude (angle of rotation of the character with respect to the printing direction), and type style (normal or italic). Then, the control flow goes to step S14 in which the start point data subjected to the transformation processing are stored in the NORMAL OUTLINE DATA memory 22, as part of the normal outline data for the relevant character.

Where the data identification code read in step S1 is not the code S, a negative decision (NO) is obtained in step S3, and the control flow goes to step S6 to determine whether the code is the code B. If an affirmative decision (YES) is obtained in step S6, step S7 is executed to read out from the main CHARACTER ROM 15 the Bezier curve data, i.e., the coordinate data representative of the coordinates of the end point and first and second control points of the Bezier curve. Step S7 is followed by step S8 similar to step S5, and then step S9 is implemented to convert the Bezier curve data subjected to the transformation processing, into short vector data representative of a plurality of short straight segments which generally define the relevant Bezier curve. More specifically, the short vector data represent the coordinates of points which define short vectors and which are located on the Bezier curve defined by the Bezier curve data as processed in step S8. These points are not necessarily located on the positions of the picture elements of a dot matrix in which the character is printed on the recording medium. Step S9 is followed by step S14 in which the short vector data (coordinate data of the short vectors) are stored as part of the normal outline data in the NORMAL OUTLINE DATA memory 22.

If a negative decision (NO) is obtained in step S6, the control flow goes to step S10 to determine whether the data identification code read in step S1 is the code L, or not. If an affirmative decision (YES) is obtained in step S10, step S12 is executed to read out from the ROM 15 the straight line data, i.e., the end point data of the straight line. Then, step S13 similar to step S5 is executed, before the straight line end point data are stored in the memory 22 in step S13.

If a negative decision (NO) is obtained in step S10, this indicates an error, and the control flow goes to step S11 to perform a suitable processing to eliminate the error and terminate one cycle of execution of the data converting routine.

After execution of step S14, the control flow goes back to step S1 to read out from the main CHARACTER ROM 15 the next data identification code of the original outline data. Subsequently, steps S1 through S14 are repeatedly executed. If the data identification code read in step S1 is not the code S, B or L, a negative decision (NO) is obtained in step S2. This means that the set of data to be read out next from the ROM 15 is none of the stroke start point data, straight line data and Bezier curve data. In this case, the control flow goes to step S15 to determine whether the data identification code is the stroke end code "*" or not. If an affirmative decision (YES) is obtained in step S15, the control flow goes back to step S1. If a negative decision (NO) is obtained in step S15, step S16 is implemented to determine whether the data identification code is the character end code "!" or not. If an affirmative decision (YES) is obtained, this means that steps S1-S15 have been executed for all of the strokes of the relevant character.

In this case, step S17 is executed to convert the normal outline data stored in the memory 22, into the corresponding batch of dot data, and to store the thus obtained dot data in the DOT DATA memory 24. The manner of conversion from the normal outline data into the dot data is described in detail in co-pending application Ser. No. 07/486,225 filed Feb. 28, 1990, assigned to the assignee of the present application, which received a Notice of Allowance Apr. 17, 1991. The disclosure in U.S. Pat. No. 5,050,228, granted on this application is herein incorporated by reference.

If the data identification code read in step S1 is not the character end code "!", a negative decision (NO) is obtained in step S16, and the control flow goes to step S18 of FIG. 3 to determine whether the code is the pattern identification code A (accent serif code), or not. If an affirmative decision (YES) is obtained in step S18, step S19 is implemented to read out from the main CHARACTER ROM 15 the dimension data following the code A, i.e., dimension data representative of the dimensions w and l of the accent serif of FIG. 6. Step S19 is followed by step S20 in which the basic ornamental pattern data corresponding to the code A, i.e., the accent serif pattern data is read out from the auxiliary CHARACTER ROM 16. In step S20, the accent serif pattern data are processed to modify the y-axis coordinate values such that the standard dimension w specified by the accent serif pattern data is changed to the dimension w specified by the dimension data of the abridged special segment data of the original outline data, and modify the x-axis coordinate values such that the standard dimension l of the accent serif is changed to the dimension l specified by the dimension data. The standard dimensions specified by the basic pattern data are those of the standard character size. Further, the x-axis and y-axis coordinate values of the modified accent serif data are translated so that the accent serif represented by the modified accent serif data is connected to one end of the relevant stroke represented by the appropriate sets of segment data of the normal outline data. Thus, a group of segment chain data representative of the accent serif defined by the abridged special segment data of the original outline data is prepared from the accent serif pattern data, based on the dimension data of the abridged special segment data. In other words, the group of segment chain data representative of a chain of special segments defining the accent serif of the relevant stroke is generated by enlarging or contracting the basic accent serif pattern having the standard dimensions w and to obtain the dimensions w and l specified by the dimension data of the original outline data, and by translating the thus enlarged or contracted accent serif pattern for connection with the relevant stroke. The generated segment chain data for the accent serif obtained in step S20 are temporarily stored in the WORKING memory 20.

If the data identification code read in step S1 is not the accent serif code A, a negative decision (NO) is obtained in step S18, and step S21 is implemented to determine whether the data identification code is the triangular serif code U or not. If an affirmative decision (YES) is obtained in step S21, step S22 is implemented to read out from the ROM 15 the dimension data following the code U, and the control flow goes to step S23 in which the basis triangular serif pattern data are read out from the auxiliary CHARACTER ROM 16. In step S23, the triangular serif pattern data are modified such that the dimensions w, l and h represented by the modified triangular serif pattern data coincide with the dimensions (FIG. 7) specified by the dimension data read from the ROM 15. The dimension h is the height of the triangular serif, while the dimension w is the distance between the start and end points S, E of the serif as measured in the y-axis direction. A group of segment chain data for the triangular serif of FIG. 7 is obtained by translating the x-axis and y-axis coordinates of the modified triangular serif pattern data for connect the triangular serif with one end of the relevant stroke. The thus obtained segment chain data are temporarily stored in the WORKING memory 20.

If a negative decision (NO) is obtained in step S21, step S24 is executed to determine whether the data identification code is the pecker serif code 0 or not. If an affirmative decision is obtained in step S24, step S25 is implemented to read out from the ROM 15 the dimension data w, l, h of FIG. 8. Step S25 is followed by step S26 in which the basic pecker serif pattern data designated by the code 0 are read out from the ROM 16. In step S26, the basic pecker serif pattern data read out from the ROM 16 are modified such that the start point Si specified by the pecker serif pattern data is moved to a start point S along the first Bezier curve B1 such that the w/l ratio of the pecker serif pattern data is changed to the w/l ratio specified by the dimension data read out from the ROM 15. In step S26, the pecker serif pattern data are further modified for enlargement or contraction to obtain the dimensions l and h specified by the dimension data, and for translation to connect the pecker serif with one end of the relevant stroke. Thus, a group of segment chain data for the pecker serif of FIG. 8 is prepared, and temporarily stored in the WORKING memory 20.

Figure 12:
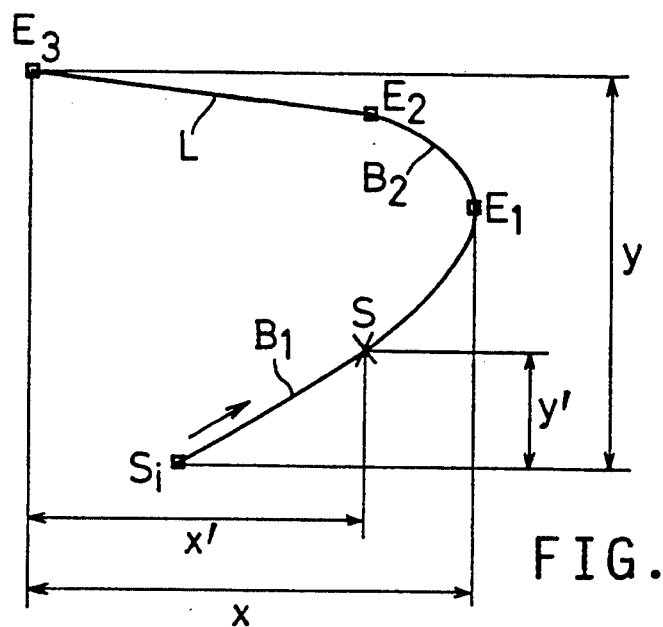
FIG. 12 is a view for explaining preparation of segment data from basic ornamental pattern data representative of a basic ornamental pattern of FIG. 8.

Referring to FIG. 12, there will be described an operation to generate a group of segment chain data for the pecker serif, based on the corresponding abridged special segment data of the original outline data stored in the ROM 15, and on the basic pecker serif pattern data stored in the ROM 16.

Initially, the start point S of the pecker serif defined by the segment chain data is determined. More specifically, the start point Si defined by the basic pecker serif pattern data is moved along the first Bezier curve B1, so that a ratio of x' (equivalent to the standard dimension w) to x (equivalent to the standard dimension as indicated in FIG. 12 is equal to the ratio w/l specified by the dimension data of the abridged special segment data. Then, the x-axis coordinate values of the start point S, end point E1 and control points Q11, Q12 (not shown) of the first Bezier curve B1, end point E2 and control points Q21, Q22 (not shown) and the end point E3 of the straight line L are multiplied by a value l/x which is obtained by dividing the dimension l of the dimension data by the standard dimension x of the basic pecker serif pattern data. Further, the y-axis coordinate values of those points are multiplied by a value h/(y-y') which is obtained by dividing the dimension h by the dimension (y-y') equivalent to the standard dimension h. Thus, the basic pecker serif pattern is enlarged or contracted according to the dimension data. Further, the enlarged or contracted pecker serif pattern is translated so that the start and end points S, E3 of the pecker serif pattern are located on the corresponding points at one end of the relevant stroke, which points are represented by the ordinary segment data of the original outline data.

If a negative decision (NO) is obtained in step S24, step S27 is implemented to determine whether the data identification code read in step S1 is the dry stop code T or not. If an affirmative decision (YES) is obtained in step S27, step S25 is implemented to read out from the ROM 15 the dimension data w, h following the code T. In the next step S29, the basic dry stop pattern data designated by the code T are read out from the ROM 16, and the x-axis and y-axis coordinates of the basic dry stop pattern data are modified for enlargement or contraction to obtain the dimensions w, h specified by the dimension data, and are translated for connection of the dry stop pattern with one end of the relevant stroke. Thus, there is prepared a group of segment chain data for the dry stop of FIG. 9, which is also temporarily stored in the WORKING memory 20.

If a negative decision (NO) is obtained in step S27, the control flow goes to step S30 to determine whether the data identification code is the square shoulder code K, or not. If an affirmative decision (YES) is obtained in step S27, step S31 is executed to read out from the ROM 15 the dimension data l, l', h following the code K. Step S31 is followed by step S32 in which the basic square shoulder pattern data designated by the code K are read out from the ROM 16. In step S32, the basic square shoulder pattern data are modified such that the start point Si is moved to the point S so that the ratio l/l' represented by the pattern data read out from the ROM 16 is changed to the ratio l/l' represented by the dimension data read out from the ROM 15. In step S32, the basic square shoulder pattern data are further modified for enlargement or contraction to obtain the specified dimensions l, h of the dimension data, and for translation of the square shoulder pattern for connection with one end of the relevant stroke. Thus, there is prepared a group of segment chain data for the square shoulder of FIG. 10, which is also temporarily stored in the WORKING memory 20.

If a negative decision (NO) is obtained in step S30, the control flow goes to step S33 to determine whether the data identification code read in step S1 is the flapper serif code H or not. If an affirmative decision (YES) is obtained in step S33, step S34 is implemented to read out from the ROM 15 the dimension data w, l1, l2, h following the code H. Step S34 is followed by step S35 in which the basic pattern data for the flapper serif of FIG. 11 designated by the code H are read out from the ROM 16. In step S35, the basic flapper serif pattern data are processed as follows: The x-axis and y-axis coordinate values of points $P_0$, $P_1$ (not shown, and equivalent to control points $Q_1$, $Q_2$ of the Bezier curve B1) and point $P_2$, and the y-axis coordinate values of points $P_3$, $P_4$ are not affected by the dimensions w, l1, l2 specified by the dimension data. The x-axis coordinate value of point $P_3$ is determined such that a distance in the x-axis direction between points $P_2$ and $P_3$ is equal to a difference between a sum of the specified dimensions l1 and l2 and a sum of the specified dimension w and a distance in the x-axis direction between points S and $P_2$. Further, the x-axis coordinate value of point $P_4$ is determined to be equal to that of point $P_3$ determined as described above. The x-axis coordinate values of points $P_5$, $P_6$ (not shown, and equivalent to control points $Q_1$, $Q_2$ of the Bezier curve B2) and point $P_7$ are determined such that the standard dimension l1 represented by the basic flapper serif pattern data is changed to the dimension l1 specified by the dimension data. The x-axis coordinate values of points $P_8$, $P_9$ (not shown, and equivalent to control points $Q_1$, $Q_2$ of the Bezier curve B3) and point $P_{10}$ are determined such that the standard dimension l2 is changed to the specified dimension l2. The Y-axis coordinate values of points $P_5$ through $P_{10}$ (end point E) are determined such that the standard dimension h is changed to the specified dimension h. The thus enlarged or contracted basic flapper serif pattern is translated for connection with one end of the relevant stroke. In this way, there is prepared a group of segment chain data for the flapper serif of FIG. 11, which is also temporarily stored in the WORKING memory 20.

If a negative decision (NO) is obtained in step S33, this indicates an error, and the control flow goes to step S36 to perform a suitable processing to eliminate the error and terminate one cycle of execution of the data converting routine.

Step S20, S23, S26, S29, S32 or S35 is followed by step S37 of FIG. 2 in which the ornamental segment chain data for the accent serif, etc. are read out from the WORKING memory 20, and are subjected to a character transformation processing similar to that in steps S5, S8 and S13. Step S37 is followed by step S38 in which the Bezier curve data of the ornamental segment chain data are converted into short-vector data representative of short vectors. The control flow then goes to step S14 in which the ornamental segment chain data whose Bezier curve data have been converted into the short-vector data are stored as part of the normal outline data in the NORMAL OUTLINE DATA memory 22.

The steps of the present data converting routine of FIGS. 2 and 3 as described above are repeatedly executed for the entirety of the original outline data (stored in the ROM 15) for the character designated by the currently active character code (stored in the TEXT memory 18). That is, steps S1–S15 and S18–S38 are repeatedly executed until an affirmative decision (YES) is obtained in step S16. In response to the affirmative decision in step S16, step S17 is implemented to convert the normal outline data stored in the memory 22 into the dot data, whereby the present data converting routine is terminated.

The data converting routine is executed for each character code stored in the TEXT memory 18, whereby a batch of dot data corresponding to the text data in the memory 18 is prepared and stored in the DOT DATA memory 24. When a printing start command is supplied from the input device 30, the CPU 12 operates to control the printing portion 32 according to the dot data stored in the DOT DATA memory 24, whereby the text represented by the text data is laser-printed on the recording medium.

It will be understood from the foregoing description that the the data converting apparatus according to the illustrated embodiment of the present invention is adapted such that several sets of basic ornamental pattern data representative of respective basic ornamental patterns are stored in the auxiliary CHARACTER ROM 16, so that outline data for an ornamental portion such as a serif which appears on two or more different strokes of the same character or different characters may be prepared by suitably changing or modifying an appropriate one of the basic ornamental patterns which is similar in shape to the relevant ornamental portion of the stroke. For the individual ornamental portions of characters, therefore, the main CHARACTER ROM 15 is required to store only abridged segment data which consist of a pattern identification code designating one of the basic ornamental patterns, and dimension data representative of some dimensions determining the size of each ornamental portion of the stroke. Usually, an ornamental portion of a character is defined by a relatively large number of stroke outlining segments, and therefore each ornamental portion of a character requires a relatively large volume of ordinary segment data, if the basic ornamental pattern data are not utilized. Thus, the present data converting apparatus makes it possible to reduce the storage capacity of a memory required for storing the outline data for all characters desired, i.e., the required total storage capacity of the main CHARACTER ROM 15 and auxiliary CHARACTER ROM 16.

It is also noted that outline data for a character generally represent the positions of multiple points successively located on the outline of the character which is designed by a designer. For a Chinese character such as that illustrated in FIG. 13 which has two or more strokes whose ornamental portions are similar in shape to each other but different in size from each other, these ornamental portions as designed inevitably have more or less different shapes due to error in designing the character outline. Accordingly, the ornamental portions having the same nominal shape tend to have poor similarity, when they are printed by a known laser printer according to the outline data that are prepared exactly following the designed character outlines. Namely, the printed characters have poor appearance. According to the present embodiment, however, all outline data sets for similar ornamental portions of strokes are prepared based on the same basic pattern data representative of a basic pattern which is similar to the ornamental portions, whereby the printed ornamental portions have high configurational uniformity or similarity and accordingly improved appearance.

It will be understood from the description of the illustrated embodiment that the main CHARACTER ROM 15 serves as an outline data memory for storing the original outline data which includes the ordinary segment data and the abridged special segment data, while the portion of the computer 10 assigned to execute steps S18-S35 of FIG. 3 cooperates with the auxiliary CHARACTER ROM 16 to function as means for generating or preparing the ornamental segment chain data representative of ornamental portions of the character strokes, based on the basic pattern data and based on the abridged special segment data which consist of the pattern identification code and the dimension data. Further, the portion of the computer 10 assigned to execute the steps shown in FIG. 2 serves as means for generating or preparing the normal outline data which includes the ordinary segment data of the original outline data, and the ornamental segment chain data prepared based on the basic ornamental pattern data and the abridged special segment data.

While the present invention has been described in detail in its presently preferred embodiment, the invention may be otherwise embodied.

In the illustrated embodiment, the auxiliary CHARACTER ROM 16 stores sets of basic ornamental pattern data each representative of the positions of the selected points (such as pattern start and end points and control points) which define a basic ornamental pattern, while the main CHARACTER ROM 15 stores as part of the original outline data the abridged special segment data including the dimension data necessary to modify the basic ornamental pattern data to obtain the ornamental segment chain data which represent the positions of points which define an ornamental portion of a character stroke. However, the auxiliary CHARACTER ROM 16 is modified so as to store mathematical functions for determining the positions of the above indicated selected points of the basic ornamental pattern, while the main CHARACTER ROM 15 is modified so as to store the abridged special segment data in the form of values to be substituted for the variables of the mathematical functions, to obtain the ornamental segment chain data representative of the positions of points which define the ornamental portion of the stroke.

While the basic ornamental pattern data stored in the auxiliary CHARACTER ROM 16 represent the six ornamental patterns such as the accent serif to be given to some strokes of the Chinese characters of the "mincho" type style, the basic ornamental pattern data may represent other ornamental portions of the characters that are defined by a chain of successive outline segments. It is also noted that the principle of the present invention is equally applicable to other types of the Chinese characters, Japanese characters, and characters used in any other languages other than Chinese and Japanese, provided that different strokes of the same character or different characters have similarly shaped portions such as serifs as appearing in the alphabetic letters. Namely, the present invention is applicable to a data converting apparatus which uses a memory for storing the outline data representative of the characters whose strokes have similar portions.

In the illustrated embodiment, basic pattern data are suitably modified to obtain individual sets of outline data representative of similar portions of character strokes, which similar portions are each defined by a chain of successive segments of the stroke outline. However, this concept of using the basic pattern data is applicable to a single segment of the stroke outline, such as the Bezier curve of the sharp shoulder (5) illustrated in FIG. 5. For this Bezier curve, a basic pattern may be used so that the basic pattern is modified according to distances between start and end points of the Bezier curve in the x-axis and y-axis directions. According to this arrangement, outline data for Bezier curves having different lengths may be obtained by suitably changing the above-indicated x-axis and y-axis distances between the start and end points. If this arrangement is not adopted, the x-axis and y-axis coordinate data of the end point and the first and second control points Q1, Q2 of the curve should be stored to define the Bezier curve of each sharp shoulder which appears on the characters. If the basic pattern for the Bezier curve of the sharp shoulder is used, only the end point data, x-axis distance data and y-axis distance data are required to be stored. This arrangement is also effective to reduce the required storage capacity of the outline data memory, and to improve the similarity of the similar outline segments of different strokes.

Although the illustrated embodiment takes the form of a data converting apparatus used for a laser printer, the present invention is equally applicable to a data converting apparatus used for any character output devices such as a printer other than the laser printer, a plotter for writing or drawing characters, and a display device for displaying the characters.

It is to be understood that the present invention may be embodied with various other changes, modifications and improvements, which may occur to those skilled in the art, in the light of the foregoing teaching.

What is claimed is:

1. A data converting apparatus for converting original outline data into normal outline data, comprising:

an original outline data memory storing a batch of original outline data indicative of at least one closed-loop outline of each of a plurality of characters, each of said at least one outline of said each character consisting of a plurality of successive segments, said plurality of characters including characters each of which comprises at least one outline each of which consists of at least one ordinary segment, and at least one special chain of segments each chain defining a specific pattern, said batch of original outline data indicative of each outline which has said at least one special chain of segments including at least one set of abridged special segment data indicative of said at least one special chain of segments, and at least one set of ordinary segment data representative of said at least one ordinary segment;

segment chain data generating means for generating a group of segment chain data based on each of said at least one set of abridged special segment data, said group of segment chain data being representative of all segments of each of said at least one special chain of segments; and outline data output means for outputting a batch of normal outline data which consists of said at least one set of ordinary segment data stored in said original outline data memory, and said group of segment chain data generated by said segment chain data generating means.

2. A data converting apparatus according to claim 1, wherein said plurality of successive segments consist of segments selected from the group consisting of a straight segment and a curved segment.

3. A data converting apparatus according to claim 2, wherein said curved segment consists of a Bezier curve, and said at least one set of ordinary segment data including at least one set of straight line data each representative of said straight segment, and at least one set of Bezier curve data each representative of said Bezier curve.

4. A data converting apparatus according to claim 3, wherein said specific pattern defined by each of said at least one special chain of segments is similar to a basic pattern.

5. A data converting apparatus according to claim 4, wherein said segment chain data generating means comprises a basic pattern data memory which stores at least one group of basic pattern data each group including a plurality of sets of segment data which represent respective segments of said basic pattern, said segment chain data generating means reading out from said basic pattern data memory one of said at least one group of basic pattern data which corresponds to said each set of abridged special segment data of said original outline data, when said segment chain data generating means reads out from said original outline data memory said each set of special segment data, said segment chain data generating means converting each of said at least one group of basic pattern data into said group of segment chain data.

6. A data converting apparatus according to claim 5, wherein each of said at least one set of abridged special segment data stored in said original outline memory comprises a pattern identification code designating one of said at least one group of basic pattern data which represents the basic pattern to which said specific pattern is similar, and a set of dimension data necessary for said segment chain data generating means to convert said one group of basic pattern data into said group of segment chain data which represents said specific pattern, said segment chain data generating means reads out from said original outline data memory said pattern identification code and said set of dimension data of said special segment data, and reads out from said basic pattern data memory said one group of basic pattern data designated by said pattern identification code, said segment chain data generating means converting said one group of basic pattern data into said group of segment chain data, by modifying said one group of basic pattern data based on said set of dimension data.

7. A character output device for outputting characters on an output medium, according to dot data representative of said characters, comprising:

an original outline data memory storing a batch of original outline data indicative of at least one closed-loop outline of each of a plurality of characters which are identified by respective character codes, each of said at least one outline of said each character consisting of a plurality of successive segments, said plurality of characters including characters each of which comprises at least one outline each of which consists of at least one ordinary segment, and at least one special chain of segments each chain defining a specific pattern, said batch of original outline data indicative of each outline which has said at least one special chain of segments including at least one set of abridged special segment data indicative of said at least one special chain of segments, and at least one set of ordinary segment data representative of said at least one ordinary segment;

a text memory for storing a batch of text data consisting of said character codes which identify the characters to be outputted on said output medium;

segment chain data generating means for reading out from said original outline data memory said batch of original outline data for each character identified by said character codes, and generating, for each outline having said at least one special chain of segments, a group of segment chain data based on each of said at least one set of abridged special segment data of said batch of original outline data, said group of segment chain data being representative of all segments of each of said at least one special chain of segments;

dot data generating means for generating a batch of dot data representative of the characters identified by said character codes, based on said at least one set of ordinary segment data stored in said original outline data memory, and said plurality of sets of segment chain data generated by said segment chain data generating means, said batch of dot data being indicative of presence or absence of image dots to be formed on said output medium in the form of a matrix of dots; and character output means for outputting on said output medium said characters identified by said character codes, according to said batch of dot data generated by said dot data generating means.

8. A character output device according to claim 7, wherein said plurality of successive segments consist of segments selected from the group consisting of a straight segment and a curved segment.

9. A character output device according to claim 8, wherein said curved segment consists of a Bezier curve, and said at least one set of ordinary segment data including at least one set of straight line data each representative of said straight segment, and at least one set of Bezier curve data each representative of said Bezier curve.

10. A character output device according to claim 9, wherein said specific pattern defined by each of said at least one special chain of segments is similar to a basic pattern.

11. A character output device according to claim 10, wherein said segment chain data generating means comprises a basic pattern data memory which stores at least one group of basic pattern data each group including a plurality of sets of segment data which represent respective segments of said basic pattern, said segment chain data generating means reading out from said basic pattern data memory one of said at least one group of basic pattern data which corresponds to said each set of abridged special segment data of said original outline data, when said segment chain data generating means reads out from said original outline data memory said each set of abridged special segment data, said segment chain data generating means converting each of said at least one group of basic pattern data into said group of segment chain data.

12. A character output device according to claim 11, wherein each of said at least one set of abridged special segment data stored in said original outline memory comprises a pattern identification code designating one of said at least one group of basic pattern data which represents the basic pattern to which said specific pattern is similar, and a set of dimension data necessary for said segment chain data generating means to convert said one group of basic pattern data into said group of segment chain data which represents said specific pattern, said segment chain data generating means reads out from said original outline data memory said pattern identification code and said set of dimension data of said abridged special segment data, and reads out from said basic pattern data memory said one group of basic pattern data designated by said pattern identification code, said segment chain data generating means converting said one group of basic pattern data into said group of segment chain data, by modifying said one group of basic pattern data based on said set of dimension data.

13. A dot-matrix printer for printing characters on a recording medium, according to dot data representative of said characters, comprising:

an original outline data memory storing a batch of original outline data indicative of at least one closed-loop outline of each of a plurality of characters which are identified by respective character codes, each of said at least one outline of said each character consisting of a plurality of successive segments, said plurality of characters including characters each of which comprises at least one outline each of which consists of at least one ordinary segment, and at least one special chain of segments each chain defining a specific pattern, said batch of original outline data indicative of each outline which has said at least one special chain of segments including at least one set of abridged special segment data indicative of said at least one special chain of segments, and at least one set of ordinary segment data representative of said at least one ordinary segment;

a text memory for storing a batch of text data consisting of said character codes which identify the characters to be printed on said recording medium;

segment chain data generating means for reading out from said original outline data memory said batch of original outline data for each character identified by said character codes, and generating, for each outline having said at least one special chain of segments, a group of segment chain data based on each of said at least one set of abridged special segment data of said batch of original outline data, said group of segment chain data being representative of all segments of each of said at least one special chain of segments;

dot data generating means for generating a batch of dot data representative of the characters identified by said character codes, based on said at least one set of ordinary segment data stored in said original outline data memory, and said group of sets of segment chain data generated by said segment chain data generating means, said batch of dot data being indicative of presence or absence of image dots to be formed on said output medium in the form of a matrix of dots; and printing means for printing on said recording medium said characters identified by said character codes, according to said batch of dot data generated by said dot data generating means.

14. A dot-matrix printer according to claim 13, wherein said printing means consists of laser-printing means for laser-printing according to said batch of dot data.

15. A dot-matrix printer according to claim 13, wherein said at least one special chain of segments includes a special chain of segments which defines a serif of a stroke of a character.

* * * * *